United States Patent [19]

Borchardt et al.

[11] Patent Number: 5,666,658
[45] Date of Patent: *Sep. 9, 1997

[54] WIRELESS SIGNAL TRANSMISSION SYSTEM, METHOD AND APPARATUS

[75] Inventors: Robert L. Borchardt, New York; William T. McGreevy, Babylon; Ashok Nawarange, Astoria; Efrain L. Rodriguez, Brooklyn, all of N.Y.

[73] Assignee: Recoton Corporation, New York, N.Y.

[*] Notice: The portion of the term of this patent subsequent to Apr. 25, 2012, has been disclaimed.

[21] Appl. No.: 427,450

[22] Filed: Apr. 24, 1995

Related U.S. Application Data

[63] Continuation of Ser. No. 259,339, Jun. 13, 1994, Pat. No. 5,410,735, which is a continuation of Ser. No. 822,598, Jan. 17, 1992, abandoned, which is a continuation-in-part of Ser. No. 665,772, Mar. 7, 1991, Pat. No. 5,272,525.

[51] Int. Cl.$^6$ ..................................................... H04B 7/00
[52] U.S. Cl. ........................ 455/42; 455/110; 455/205; 455/344; 455/351
[58] Field of Search ..................................... 455/42, 43, 66, 455/95, 110, 111–113, 120, 121, 122, 123–125, 205, 208, 214, 344, 351, 352, 127, 343, 318; 348/725, 731, 738; 381/2–3; 379/62; 331/64–96

[56] References Cited

U.S. PATENT DOCUMENTS

| | | |
|---|---|---|
| 3,041,539 | 6/1962 | Parker . |
| 3,299,359 | 1/1967 | Court et al. . |
| 3,590,382 | 6/1971 | Kenney . |
| 3,650,265 | 3/1972 | Mountjoy . |
| 4,112,377 | 9/1978 | Tanner et al. . |
| 4,509,198 | 4/1985 | Nagatomi ................... 455/4.1 |
| 4,586,081 | 4/1986 | St. Arnaud et al. . |
| 4,592,093 | 5/1986 | Ouchi et al. ................ 455/4.1 |
| 4,596,081 | 6/1986 | St. Arnaud et al. . |
| 4,646,150 | 2/1987 | Robbins et al. . |
| 4,748,685 | 5/1988 | Rozanski, Jr. et al. . |
| 4,776,039 | 10/1988 | Akaiwa . |

(List continued on next page.)

OTHER PUBLICATIONS

Electronic Communication, Shrader et al, 1985, pp. 423–424 1985.
"Nady WTS-1 Wireless Speaker System", Radio Electronics, Aug. 1986, pp. 27–28.
"Build This", Radio Electronics, Aug. 1988, pp. 37–42.
"New Band at 902–928 MHz", Happenings, Oct. 1985, pp.51–53.
"Heath Model HD–1420 VLF Convereter and Model–1422 Antenna Noise Bridge", Product Review, Nov. 1986, pp. 40–42 Nov. 1986.

(List continued on next page.)

*Primary Examiner*—Edward F. Urban
*Attorney, Agent, or Firm*—Levisohn, Lerner, Berger & Langsam

[57] ABSTRACT

Systems, methods and apparatus are provided for conducting local wireless audio signal transmissions from a local audio signal source to a person within a local signal transmission area. In certain embodiments, the transmissions are conducted over the 900 MHz local transmission band to a portable receiver unit supported on the headband of a stereo headphone unit. The receiver unit serves to down convert the 900 MHz signal to a local frequency band which is received by an FM receiver of the receiver unit which serves to reproduce the audio signals therefrom which are, in turn, converted to acoustic signals by electroacoustic transducers of the headphone. A transmitter unit includes a ceramic resonator stabilized FM transmitter, as well a filter for suppressing high frequency noise in an audio modulation signal, a stereo audio multiplexing unit utilizing a $3f_H$ subcarrier and an overmodulation detection unit. In certain embodiments, the receiver unit is powered by a rechargeable battery which is recharged from the transmitter unit.

21 Claims, 12 Drawing Sheets

U.S. PATENT DOCUMENTS

| | | |
|---|---|---|
| 4,829,570 | 5/1989 | Schotz . |
| 4,876,710 | 10/1989 | Reed et al. . |
| 4,893,347 | 1/1990 | Eastmond et al. . |
| 4,905,087 | 2/1990 | Lupinetti . |
| 4,916,532 | 4/1990 | Streck et al. ............................ 455/66 |
| 5,023,931 | 6/1991 | Streck et al. . |
| 5,038,402 | 8/1991 | Robbins . |
| 5,045,948 | 9/1991 | Streck et al. . |
| 5,047,860 | 9/1991 | Rogalski et al. . |
| 5,077,835 | 12/1991 | Margairaz et al. . |
| 5,101,499 | 3/1992 | Streck et al. . |
| 5,115,463 | 5/1992 | Moldavsky et al. . |
| 5,123,029 | 6/1992 | Bantz et al. . |
| 5,142,369 | 8/1992 | Grubbs et al. . |
| 5,142,370 | 8/1992 | Wignot et al. . |
| 5,142,371 | 8/1992 | Lehmann . |
| 5,151,838 | 9/1992 | Dockery . |
| 5,155,590 | 10/1992 | Beyers, II et al. . |
| 5,161,021 | 11/1992 | Tsai . |
| 5,198,903 | 3/1993 | Tinaphong . |
| 5,204,984 | 4/1993 | Fujisaki et al. . |
| 5,276,904 | 1/1994 | Mutzig et al. . |
| 5,297,203 | 3/1994 | Rose et al. . |
| 5,299,264 | 3/1994 | Schotz et al. . |
| 5,311,542 | 5/1994 | Eder . |
| 5,327,230 | 7/1994 | Dockery . |
| 5,349,386 | 9/1994 | Borchardt et al. . |
| 5,371,783 | 12/1994 | Rose et al. . |

OTHER PUBLICATIONS

"The 900 MHz Band—What's In Stor for Amateurs?", Helfrick, Jan. 1985, pp. 27–30.

"Radio Data System", Friedman, Radio Electronics, Dec. 1988, pp. 65–68 and 76.

"SCA/FM–Stereo Receiver, Part 1", Graf et al., Radio Electronics, Aug. 1987, pp. 39–44 and 81.

"SCA/FM–Stereo Receiver, Part 2", Graf et al., Radio Electronics, Sep. 1987, pp. 46 and 50–52.

"The New World of Communications", Kobb, Radio Electronics, Sep. 1986, pp. 49–52.

"Build This: One–Band Shrt Wave Converter", Graf et al., Oct. 1989, pp. 49–51.

"903–Mhz Linear Amplifiers Part 1", Mascaro, Jun. 1990, pp. 18–25.

"903–MHz Linear Amplifiers Part 2", Mascaro, Jul. 1990, pp. 28–31.

"A Practical Direct–Sequence Spread–Spectrum UHF Link", Kesteloot, May 1989, pp. 14–21.

"Using the MC2831A FM Transmitter Subsystem IC", DeMaw, Mar. 1990, pp. 21 and 32–33.

"Build This: Wireless FM Microphone", Spiwak, Mar. 1989, pp. 43–45.

"Circuits: Single–Chip Frequency Converter", Covington, Apr. 1990, pp. 49–52.

"Build This: Low Frequency Converter", Sheets et al, Sep. 1989, pp. 47–50.

"A CW Transmitter for 902 MHz", Hilliard, Mar. 1986, pp. 32–39.

Sheets, William and Rudolf F. Graf; *Wireless Stereo Link*, Radio Electronics, Mar. 1988, pp. 54–58.

Gibilisco, Stan and Neil Sclater; Encyclopedia of Electronics, 2nd Ed.; 1990, pp. 318–319.

Hilliard, Donald L.; *A 902–to 144–MHz Receive Converter*, QST, Oct. 1985, pp. 21–26.

Sager, Phillip; *Part 15 Low–Power Devices Ruling Adopted—Includes Four Ham Bands!*; QST, Jun. 1989, p. 63.

Pagel, Paul; *Quorum Communications Downconverters*; QST, Nov. 1990, p. 32.

McClellan, Gary; *New Life for Old Car Radios*; Radio–Electronics, May 1987, pp. 42–44 (Part 1); Jun. 1987, pp. 50–52 (Part 2).

The AARL Handbook for the Radio Amateur, 1985 62nd Edition.

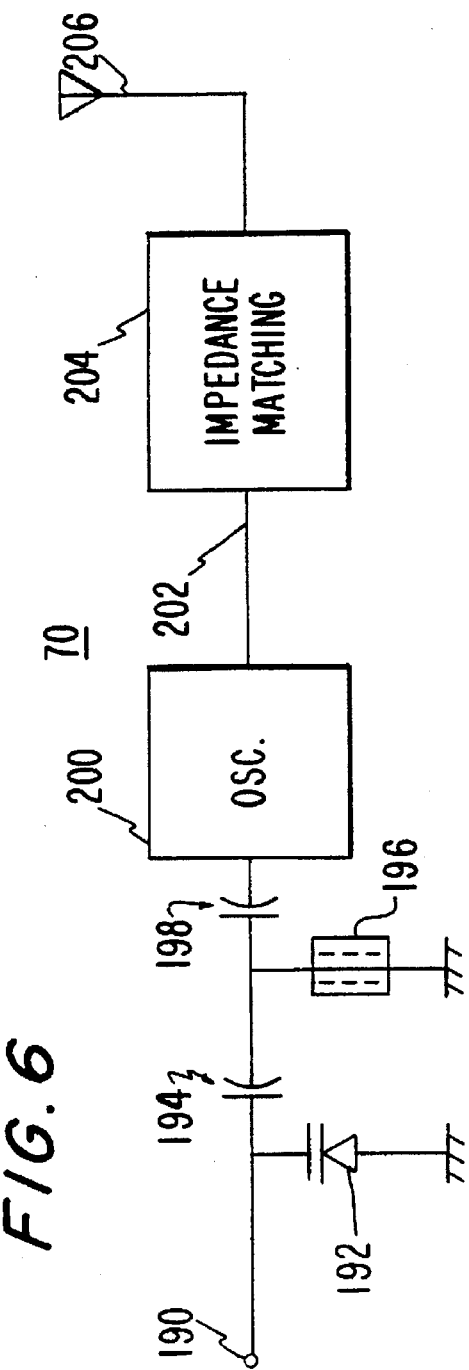
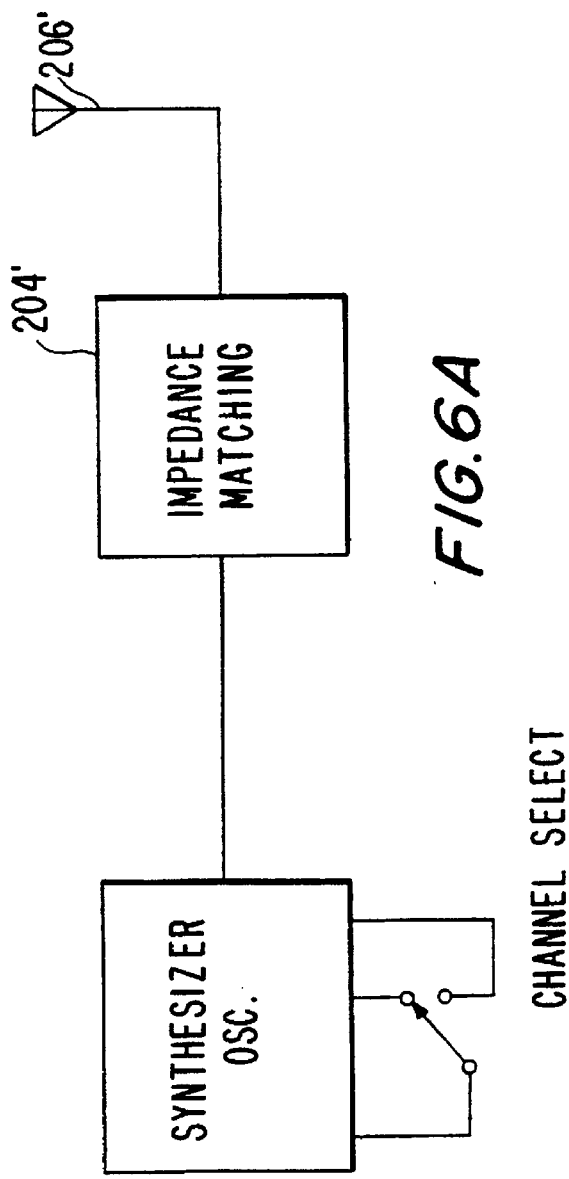

WIRELESS SIGNAL TRANSMISSION SYSTEM, METHOD AND APPARATUS

This application is a Rule 1.60 continuation application of U.S. Ser. No. 08/259,339, filed Jun. 13, 1994, now U.S. Pat. No. 5,410,735 which issued on Apr. 25, 1995, which is a continuation of U.S. Ser. No. 07/822,598 filed on Jan. 17, 1992, now abandoned, which application was itself a continuation-in-part application of U.S. Ser. No. 665,772, filed Mar. 7, 1991, now U.S. Pat. No. 5,272,525. U.S. Pat. Nos. 5,272,525 and 5,410,735 were assigned to Recoton Corporation as was application Ser. No. 822,598.

BACKGROUND OF INVENTION

The present invention relates to wireless signal transmission systems, methods and apparatus, for example, radio transmission apparatus for transmitting audio signals within a local transmission area to a portable radio receiver means carried on the person of the user.

Personal wireless audio signal transmission apparatus include systems which transmit audio signals, such as television audio signals, by means of infrared light received by a personal infrared light receiving device worn by a listener. It will be appreciated that such transmission systems require a line-of-sight transmission path, so that the system is not workable if walls, furniture or other objects intervene between the transmitter and receiver. Accordingly, while infrared transmission systems may be useful where, for example, a person is seated several feet from a television receiver to which the infrared transmitter is connected for transmitting television sound, the transmission path may be interrupted if, for example, the listener turns his or her head away from the transmitter or a person walks between the transmitter and the listener. Moreover, it is not practical to utilize an infrared transmission system where, for example, the listener is positioned in another room or outside a building in which the transmitter is located.

Local wireless television transmission systems are available which transmit television signals from a local source, such as a television or VCR, within the 900 MHz local television transmission band to a receiver which downconverts the television signals to a frequency band which may be tuned by a conventional television receiver. Such systems, therefore, employ receivers which are designed for use with a stationery television set and which optionally utilize a directional antenna carefully positioned for best reception of the 900 Mhz signals radiated by the local transmitter. It is desirable, therefore, that the receiver act as a stable base for supporting the receiving antenna in the best disposition to receive the locally transmitted signal, and therefore, the receiver is typically of a size and weight not practical for carrying on the person of a listener.

Many television stations now include stereo audio signals in their transmissions. It is, therefore, desirable that a personal wireless audio signal transmission apparatus provide the capability of transmitting stereo audio signals reproduced by a television receiver. Conventionally, stereo audio signals are formed by adding the right and left audio channels to form a first signal and subtracting the right and left channels to form a second signal which is modulated on a subcarrier of 38 kilohertz. The subcarrier is suppressed and the combination of the first signal, the subcarrier suppressed modulated second signal and a pilot signal having a frequency of 19 kilohertz (one-half that of the subcarrier), constituting a multiplexed stereo signal, modulates a carrier for transmission. Conventional integrated circuits for producing such multiplexed stereo signals are available commercially.

However, audio signals provided by a television receiver typically contain unwanted components at the horizontal frequency of the video signal (approximately 15.734 kilohertz in an NTSC signal) and harmonics thereof. Applicants have found that the use of a 38 kilohertz subcarrier to form the multiplexed stereo signal causes mixing with the second harmonic of the NTSC signal, resulting in audible beat interference. In an attempt to overcome this problem, applicants have instead employed a subcarrier having a frequency equal to two times the horizonal frequency of the video signal, approximately 31.5 kilohertz. However, similar beat interference problems resulted. Applicants further attempted to overcome this problem with the use of a subcarrier equal to four times the horizontal video frequency, but were unsuccessful due to a loss of stereo separation resulting from the use of an excessively high subcarrier frequency.

With the introduction of digital audio recording media, such as compact discs, and digital reproduction techniques, the ability to reproduce high quality audio signals having superior frequency response and wide dynamic range requires the provision of a similarly capable personal wireless transmission system. The transmitter of such a system must be capable of modulating a carrier without introducing audible distortion at the receiver, for example, due to overmodulation. Transmitters typically employ an overmodulation detector which provides a visual indication when the level of the modulating signal is excessive, thus to enable a user to avoid overmodulation distortion while maintaining a desirably high signal-to-noise ratio.

Conventional overmodulation detectors utilize a threshold detector whose output changes state when a level of a modulation signal exceeds a predetermined threshold level, and resumes a prior state once the level of the modulation signal falls below the predetermined threshold level. The output of the threshold detector is used to drive a visual indicator, such as an LED. However, modulation signals which exceed the threshold level for only brief intervals might not produce a visible indication by the conventional apparatus. This becomes especially troublesome where the modulation signal is supplied by a source such as a compact disc player which can produce an output signal having much sharper peaks than typical analog reproduction devices such as a phonograph or magnetic tape recorder. Accordingly, it is possible that a conventional overmodulation detector will be unable to provide a visible indication of sharp peaks in the modulation signal, such as those provided by a compact disk player, with the result that objectionable overmodulation distortion is audible at the receiver, but not detectable by the overmodulation detection circuit.

It will be readily appreciated that a personal wireless audio receiver must be battery operated in order to permit mobility of the person while the receiver is in use. However, the need to replace worn out batteries from time to time is a nuisance, so that it is desirable to employ rechargeable batteries to power a personal wireless audio receiver. It is also inconvenient, however, to remove rechargeable batteries for recharging and subsequently reinstall the same. In addition, the user may find that the batteries need recharging when it is desired to resume use of the receiver, which is also inconvenient.

OBJECTS AND SUMMARY OF THE PRESENT INVENTION

Accordingly, it is one object of the present invention to provide a personal wireless signal transmission system, apparatus and method which alleviate the problems and shortcomings of the above described systems and techniques.

Another object of the invention is to provide a local wireless signal transmission system and method which both is economical and provides the ability to transmit signals with low distortion.

A further object of the present invention is to provide a local wireless signal transmission system and method which employ personal receiver means carryable on the person of the user thereof and which provide both convenient and economical operation.

Still another object of the present invention is to provide a local wireless audio signal transmission system, as well as a personal wireless receiver unit for use with such a system, wherein frequency modulated signals transmitted within a first relatively high frequency band are downconverted to a second lower frequency band for reception by miniaturized frequency modulation receiver means, thus to provide an economical, lightweight personal audio receiver which may be worn or carried by a user.

It is a further object of the present invention to provide a local wireless audio signal transmission system and method for transmitting high quality audio signals from a local audio signal source, which is subject to high frequency audio noise, such as a television receiver.

Yet another object of the present invention is to provide an overmodulation detector apparatus and method capable of generating a visual indication of the occurrence of overmodulation, even when caused by modulation signals of very brief duration.

Yet still another object of the present invention is to provide a method and apparatus of transmitting stereo audio signals from a received television signal which avoids the problem of subcarrier beat interference with video signal components of the television signal.

In accordance with a first aspect of the present invention, a local wireless signal transmission system comprises: radio frequency oscillator means for producing a radio frequency carrier, the radio frequency oscillator means including a ceramic resonator for establishing a first predetermined frequency of the radio frequency carrier; modulation means coupled with the ceramic resonator for shifting the frequency of the radio frequency carrier in response to a modulation signal for producing a frequency modulated radio frequency signal; means for radiating the frequency modulated radio frequency signal within a local transmission area; and receiver means for receiving the radiated signal within the local transmission area, the receiver means being further operative to demodulate the received signal to reproduce the modulation signal.

In accordance with another aspect of the present invention, a local wireless signal transmission method comprises the steps of: producing a radio frequency carrier having a first predetermined frequency established by a ceramic resonator; shifting the frequency of the radio frequency carrier from the first predetermined frequency in response to a modulation signal to produce a frequency modulated radio frequency signal; radiating the frequency modulated radio frequency signal within a local transmission area; receiving the radiated signal within the local transmission area; and demodulating the received signal to reproduce the modulation signal.

In accordance with a further aspect of the present invention, a local wireless audio signal transmission system for transmitting audio signals from a local audio signal source to a person within a local signal transmission area comprises: local radio transmitter means for transmitting the audio signals wirelessly within the local signal transmission area in the form of frequency modulated radio signals within a first, relatively high frequency band; and personal wireless receiver means for receiving the frequency modulated radio signals for reproducing the audio signals therefrom, the personal wireless receiver means comprising: antenna means for receiving the locally transmitted frequency modulated radio signals; downconversion means for downconverting the received frequency modulated radio signals to a second frequency band including signal frequencies lower than signal frequencies included in the first, relatively high frequency band; frequency modulation receiver means for receiving the downconverted frequency modulated radio signals and reproducing the audio signals therefrom; and coupling means for supplying the reproduced audio signals from the frequency modulation receiver means to electroacoustic transducer means.

In accordance with a still further aspect of the present invention, a personal wireless receiver unit for receiving locally transmitted frequency modulated audio signals produced by a local wireless audio signal transmitter, the locally transmitted signals being produced within a first, relatively high frequency band, comprises: antenna means for receiving the locally transmitted signals; downconversion means for downconverting the received locally transmitted frequency modulated audio signals to a second frequency band including signal frequencies lower than signal frequencies included in the first, relatively high frequency band of the received locally transmitted frequency modulated audio signals; frequency modulation receiver means for receiving the downconverted frequency modulated audio signals and reproducing audio signals therefrom; and coupling means for supplying the reproduced audio signals from the frequency modulation receiver means to electroacoustic transducer means.

In accordance with yet another aspect of the present invention, a local wireless audio signal transmission system for transmitting audio signals from a local audio signal source to a person within a local signal transmission area, comprises: local radio transmitter means for transmitting the audio signals wirelessly within the local signal transmission area in the form of modulated radio signals, the local radio transmitter means including input means for receiving the audio signals, low pass filter means for attenuating noise in the received audio signals above a predetermined frequency value, and means for producing radio frequency transmission signals modulated by the filtered audio signals; and personal radio receiver means for receiving the modulated radio frequency transmission signals and carryable on the person of a user, the personal radio receiver means comprising means for demodulating the received signals to reproduce the filtered audio signals and electroacoustic transducer means for converting the filtered audio signals to signals audible by the user.

In accordance with a still further aspect of the present invention, a local wireless audio signal transmission method for transmitting audio signals from a local audio signal source to a person within a local signal transmission area comprises the steps of: receiving the audio signals from the local audio signal source at an input of a local radio transmitter means; low pass filtering the received audio signals to attenuate noise therein above a predetermined frequency value; producing radio frequency transmission signals modulated by the filtered audio signals; receiving the modulated radio frequency transmission signals with the use of a personal radio receiver means carried on the person of a user; demodulating the received signals by means of the personal radio receiver means to reproduce the filtered audio signals; and converting the filtered audio signals to signals audible by the user.

In accordance with another aspect of the present invention, a local wireless signal transmission system comprises: radio frequency transmitter means for transmitting a signal within a local wireless signal transmission area, the radio frequency transmitter means including means for coupling to a source of electrical energy; and personal receiver means carryable on the person of a user thereof for receiving the transmitted signal within the local wireless signal transmission area, the receiver means including rechargeable battery means for providing operating power to the receiver means, and first coupling means for receiving power for recharging the rechargeable battery means; the transmitter means including second coupling means for coupling with the first coupling means of the receiver means for supplying recharging power to the rechargeable battery means from the source of electrical energy when the receiver means is placed in contact with the transmitter means; the transmitter means further including switching means operative in a first switching mode for disabling transmissions by the transmitter means when the first coupling means is coupled with the second coupling means for supplying recharging power to the receiver means, the switching means being further operative in a second switching mode for enabling transmissions by the transmitter means when the first coupling means is uncoupled from the second coupling means.

In accordance with a further aspect of the present invention, a method of operating a local wireless signal transmission system comprises the steps of: providing radio frequency transmitter means for transmitting a signal within a local wireless signal transmission area; coupling the radio frequency transmitter means with a source of electrical energy; providing a personal receiver means carryable on the person of a user thereof for receiving the transmitted signal within the local wireless signal transmission area, the personal receiver means including rechargeable battery means for providing operating power to the personal receiver means; coupling the radio frequency transmitter means with the personal receiver means to supply power from the radio frequency transmitter means to the personal receiver means for recharging the rechargeable battery means; disabling transmissions by the radio frequency transmitter means when the rechargeable battery means of the personal receiver means is supplied with recharging power from the radio frequency transmitter means; uncoupling the radio frequency transmitter means and the receiver means to disable the supply of recharging power; and enabling transmissions by the radio frequency transmitter means upon uncoupling of the radio frequency transmitter means from the personal receiver means.

In accordance with still another aspect of the present invention, an overmodulation detector comprises: input means for receiving a modulation signal; detector means for producing overmodulation detection signals in response to absolute values of the modulation signal exceeding a predetermined signal level, the detector means being operative to produce respective ones of the overmodulation detection signals in response to corresponding narrow peaks of the modulation signal having absolute values which exceed said predetermined signal level for respective periods less than a predetermined duration such that the respective ones of the overmodulation detection signals each have a duration exceeding the respective period of its corresponding peak; and indicator means for indicating an overmodulation condition to a user in response to the overmodulation detection signals.

In accordance with a still further aspect of the present invention, a method for detecting overmodulation by a modulation signal comprises the steps of: producing overmodulation detection signals in response to absolute values of the modulation signal exceeding a predetermined signal level, respective ones of the overmodulation detection signals produced in response to corresponding narrow peaks of the modulation signal having absolute values which exceed said predetermined signal level for respective periods less than a predetermined duration each having a duration exceeding the respective period of its corresponding peak; and indicating an overmodulation condition to a user in response to the overmodulation detection signals.

In accordance with another aspect of the present invention, a method of transmitting stereo audio signals from a received television signal having a horizonal frequency $f_H$ comprises the steps of: receiving right and left channel audio signals obtained by demodulation from the received television signal; adding the right and left channel audio signals to form a first combined audio signal; subtracting the right and left channel audio signals to form a second combined audio signal; modulating a subcarrier with one of the first and second combined audio signals, the subcarrier having a frequency substantially equal to $3f_H$ to form a subcarrier modulated signal; combining the other of the first and second combined audio signals with the subcarrier suppressed signal to form a stereo multiplexed audio signal; and transmitting the stereo multiplexed audio signal.

In accordance with a further aspect of the present invention, a transmitter apparatus for transmitting stereo multiplexed audio signals from a received television signal having a horizonal frequency $f_H$ comprises: input means for receiving right and left channel audio signals obtained by demodulation from the received television signal; means for adding the right and left channel audio signals to form a first combined audio signal; means for subtracting the right and left channel audio signals to form a second combined audio signal; means for modulating a subcarrier with one of the first and second combined audio signals, the subcarrier having a frequency substantially equal to $3f_H$ to form a subcarrier modulated signal; means for combining the other of the first and second combined audio signals with the subcarrier modulated signal to form a stereo multiplexed audio signal; and transmitter means for transmitting the stereo multiplexed audio signal.

BRIEF DESCRIPTION OF THE DRAWINGS

FIGS. 6 and 6A are block diagrams of radio frequency circuits incorporated in the transmitter unit of FIG. 2A.

DETAILED DESCRIPTION OF CERTAIN PREFERRED EMBODIMENTS

Figure 1:
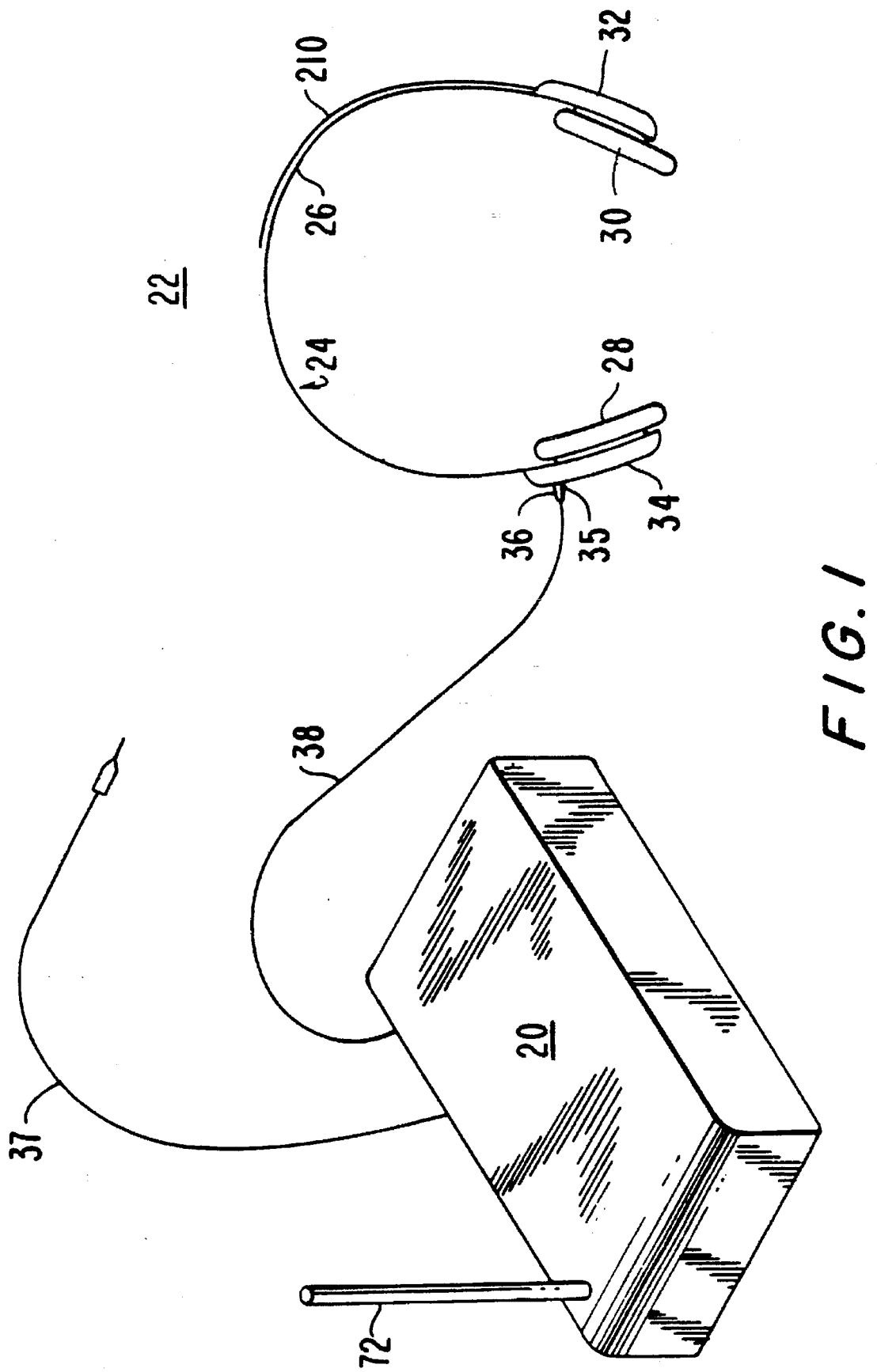
FIG. 1 is a diagrammatic view of a transmitter unit and a receiver unit of a local wireless audio signal transmission system in accordance with an embodiment of the present invention.

With reference first to FIG. 1, a local wireless audio signal transmission system in accordance with one embodiment of the present invention includes a transmitter unit 20 for transmitting multiplexed stereo audio signals over the 900 MHz local transmission band extending from approximately 902 MHz to 928 MHz, and a receiver unit 22 for receiving the multiplexed stereo audio signals transmitted from the transmitter unit 20. The receiver unit 22 includes a stereo headphone unit 24 which enables the receiver unit 22 to be worn on the head of a listener. The headphone unit 24 includes a headband support member 26 together with left and right electroacoustic transducer elements covered by respective earpads 28 and 30. Receiver circuits of the unit 22 are enclosed by a first housing 32 mounted on the headband support member 26 adjacent earpad 30, while a rechargeable battery is enclosed within a second housing 34 mounted on the headband support member 26 adjacent the earpad 28. The receiver circuit is coupled with the rechargeable battery by battery leads (not shown for purposes of simplicity and clarity) supported by the member 26.

Transmitter unit 20 includes a stereo audio input cable 37 for coupling the unit 20 with a stereo audio signal source. Transmitter unit 20 is also provided with a one quarter wavelength transmitting antenna 72 for wirelessly transmitting the 900 MHz multiplexed stereo audio modulated signal to the receiver unit 22 which receives the same at a receiving antenna 210 which is also supported by the headband support member 26. The rechargeable battery enclosed with the second housing 34 of the receiver unit 22 is coupled with a recharging input jack 35 which, as illustrated in FIG. 1, is shown connected with a recharging plug 36 connected by means of a recharging cable 38 to a battery charger circuit of the transmitter unit 20, described in greater detail below. In use for receiving wireless audio signal transmissions from the transmitter unit 20, the receiver unit 22 is uncoupled from the plug 36 and worn on the listener's head for reproducing the wirelessly transmitted stereo audio signals from the transmitter unit 20.

Figure 2A:
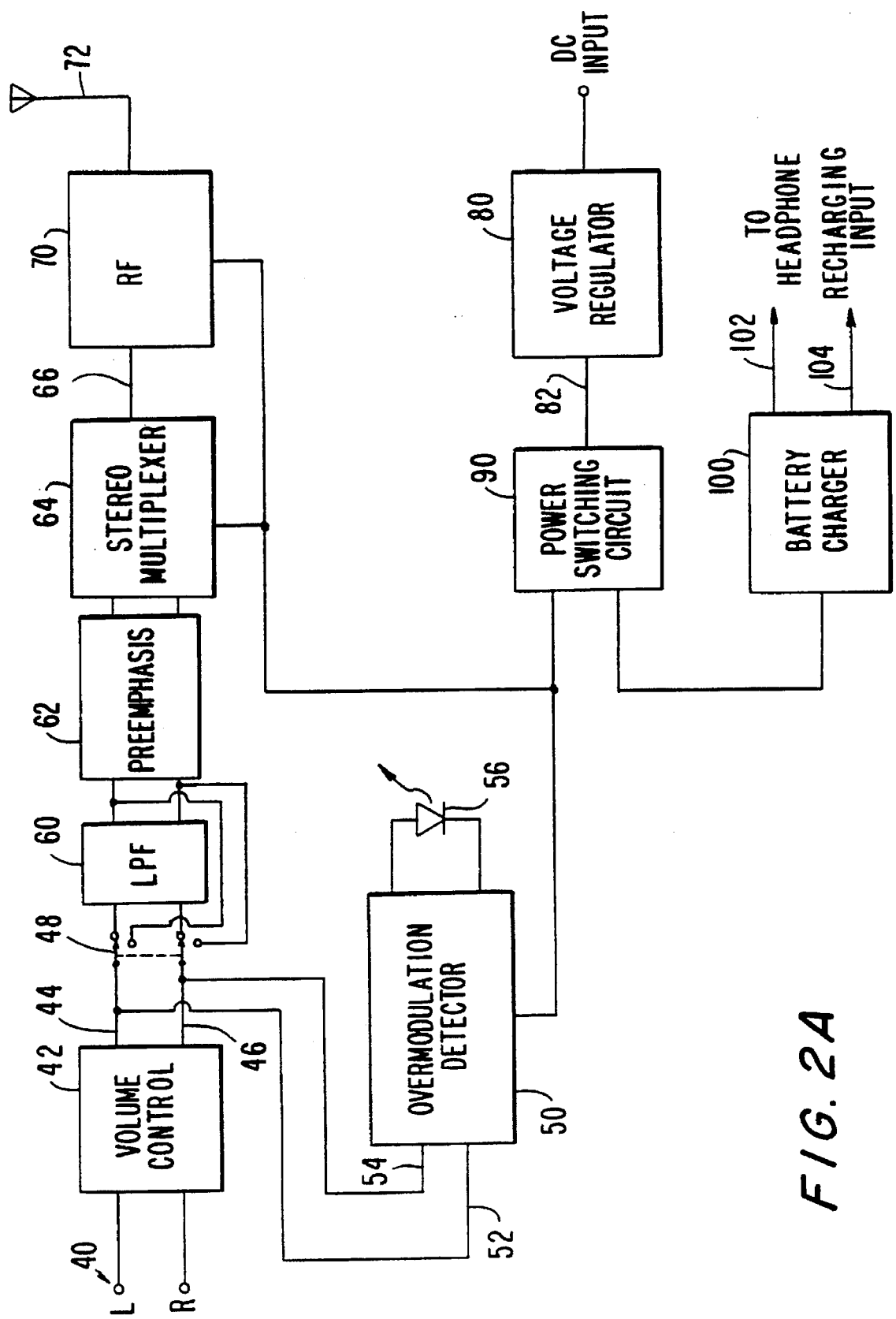
FIG. 2A is a block diagram of the transmitter unit of FIG. 1.

With reference now to FIG. 2A, the transmitter unit 20 is provided with a pair of input terminals 40 for receiving stereo audio modulation signals. The pair of input terminals 40 include a first input terminal L for receiving a first stereo audio signal from the left channel of a stereo audio signal source and a second input terminal R for receiving a second stereo audio input signal from the right channel of the stereo audio signal source. The stereo audio signal source may be, for example, a television receiver capable of supplying stereo audio output signals, a high fidelity receiver or amplifier, VCR, compact disc player, video disc player, magnetic tape reproducing apparatus, phonograph, etc. The pair of input terminals 40 are connected with a stereo input jack of the transmitter unit 20 (not shown for purposes of simplicity and clarity), to which the cable 37 of FIG. 1 is removably connected for coupling the unit 20 with a local stereo audio signal source. The first and second input terminals, L and R, are coupled with an input of a volume control 42 which permits a user to adjust the signal levels of the input audio signals in order to achieve a desirably high signal modulation level to maximize the signal to noise ratio of the signal radiated by the transmitter unit 20. Another, and countervailing, purpose is to avoid overmodulation of the radiated signal which results in signal distortion. The volume adjusted first and second input audio signals are supplied at respective output terminals 44 and 46 of the volume control 42.

In order to permit the user to determine whether overmodulation is taking place, an overmodulation detector 50 in accordance with one aspect of the present invention is provided. Respective first and second input terminals 52 and 54 thereof are coupled with output terminals 44 and 46 of the volume control 42 to receive the volume adjusted first and second input audio signals. The overmodulation detector 50 is operative to produce an overmodulation detection signal whenever an absolute value of either the signal received at the terminal 52 or the signal received at the terminal 54 exceeds a predetermined signal level which indicates an overmodulation condition. An LED 56 is coupled with an output of the overmodulation detector 50 which serves to energize the LED 56 by means of a drive signal produced in response to each overmodulation detection signal.

As described in greater detail hereinbelow, the overmodulation detector 50 is operative to produce respective ones of the overmodulation detection signals in response to corresponding narrow peaks of the volume adjusted audio signals having absolute values which exceed the predetermined signal level for respective periods less than a predetermined duration, such that the respective ones of the overmodulation detection signals each have a duration exceeding the respective period of its corresponding peak. In this fashion, it is possible to ensure that the overmodulation detection signal extends for a minimum amount of time necessary to generate a visually perceptible output from the LED 56. As will be seen from the more detailed discussion of the overmodulation detector 50 contained hereinbelow, by lengthening the duration of the overmodulation detection signal with respect to the duration of narrow signal peaks of the input signals received at the terminals 52 and 54, the overmodulation detector 50 enables the user to determine when input signal peaks exceeding a maximum modulation level have occurred, even when such peaks extend for only very brief intervals of time. This is especially useful for transmitting audio signals produced by devices such as compact disc players which produce signals having wide dynamic and frequency ranges.

The output terminals 44 and 46 of the volume control 42 are coupled with respective moveable terminals of a double pole, double throw switch 48. Each of a first pair of fixed terminals of the switch 48 is connected with a respective input terminal of a low pass filter circuit 60. The circuit 60 carries out low pass filtering of the signals received at the respective input terminals thereof by strongly attenuating frequency components thereof above 12 kilocycles. In this fashion, and in accordance with another aspect of the present invention, high frequency audio noise which may be present in the signals received at the pair of input terminals 40 may be effectively removed. This feature is particularly advantageous where audio signals provided from a television receiver are to be transmitted, since these signals are rich in audible beat interference at the horizontal scanning frequency of approximately 15,734 kilocycles. This feature is likewise useful for suppressing high frequency noise in signals reproduced with the use of a tape deck and for suppressing amplitude modulation beat notes in signals supplied by an AM receiver subject to interference by signals from adjacent stations on the AM band. The filtered signals from circuit 60 are provided thereby to respective inputs of a preemphasis circuit 62. The circuit 62 carries out preemphasis in a conventional manner in order to boost the levels of high signal frequencies which serves to reduce noise in the transmitted signal, thus to improve the signal-to-noise ratio thereof.

For certain applications, such as the transmission of audio signals produced by a compact disc player, it is preferable to bypass the filter circuit 60 in order to preserve high frequency components of the audio signals. Accordingly, each of a second pair of fixed terminals of the switch 48 is connected with a respective input of the preemphasis circuit 62 to permit a user to selectively engage or disengage the low pass filter circuit 60 depending on the presence or absence of high frequency noise (for example, video signal noise in the audio output of a television receiver) in the audio signal. In the alternative, in a modified transmitter unit in accordance with the present invention the switch 48 and low pass filter circuit 60 are omitted from the unit so that the output terminals 44 and 46 of the volume control 42 are connected directly with respective inputs of the preemphasis circuit 62.

Figure 2B:
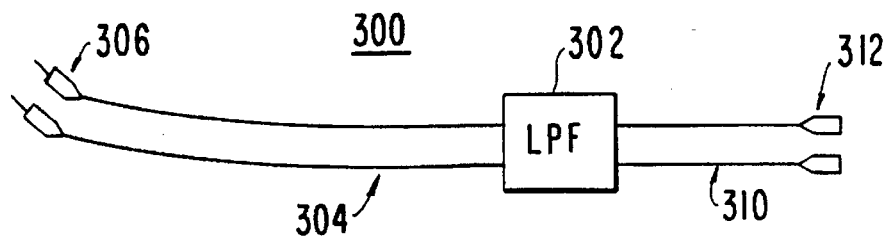
FIG. 2B is a diagrammatic view of a stereo audio cable for use with a modified transmitter unit in accordance with another embodiment of the present invention.

With reference also to FIG. 2B, in this alternative embodiment of the transmitter unit a modified stereo audio input cable 300 includes a low pass filter 302 affixed thereto and supported thereby for carrying out the function of the low pass filter circuit 60 of FIG. 2A. Cable 300 includes a first pair of audio cables 304 each connected at a first end with a respective one of a first pair of audio plugs 306 adapted to connect with a pair of audio output jacks of an audio signal source, such as a television receiver, whose output is likely to include high frequency audio noise. Each of the first pair of audio cables 304 is connected at a second end with a respective input of the low pass filter circuit 302. Cable 300 also includes a second pair of audio cables 310 connected at a first end with respective outputs of the low pass filter circuit 302 and at a second end with a respective one of a second pair of audio plugs 312 for connecting the cable 300 with corresponding left and right channel inputs of the modified transmitter unit. It will be appreciated that, in accordance with the modified transmitter unit, low pass filtering to remove high frequency audio noise is enabled by using the cable 300 of FIG. 2A, while in the alternative, low pass filtering may be disabled by employing a different audio input cable which does not incorporate a low pass filter circuit.

After preemphasis, the left and right channel volume adjusted audio signals are supplied to respective inputs of a stereo multiplexer 64 which is operable to produce a multiplexed stereo modulation signal which it supplies at an output terminal 66 thereof. The stereo multiplexer 64 forms a baseband audio component representing the sum of the left and right channel audio signals (L+R) and a difference signal representing the difference between the left channel audio signal and the right channel audio signal (L−R). The stereo multiplexer 64 produces a subcarrier having a frequency which is substantially equal to three times the horizonal frequency $f_H$ of the video signal associated with the input left and right channel audio signals. Accordingly, where such video signal conforms to the NTSC system, the subcarrier frequency is selected to be substantially equal to 3×15.734 kilohertz, approximately 47.202 kilohertz. The stereo multiplexer 64 modulates the approximately 47.202 kilohertz subcarrier with the difference signal and suppresses the subcarrier to form a suppressed carrier signal representing the difference between the left channel audio signal and the right channel audio signal (L−R). The stereo multiplexer 64 also produces a pilot signal having a frequency equal to one half the subcarrier frequency, that is, approximately 23,601 kilohertz, and combines the baseband audio component with the suppressed carrier signal and the pilot signal to form the multiplexed stereo modulation signal at the output terminal 66 thereof.

Applicants have found that the use of a subcarrier having a frequency substantially equal to three times the horizontal scanning frequency provides the ability to avoid beat interference with video signal components at the horizontal scanning frequency and harmonies thereof. Accordingly, beat interference which can occur where the subcarrier frequency is either substantially equal to the horizontal scanning frequency or second harmonic thereof can be avoided, without the loss of stereo separation which can occur where the subcarrier frequency is higher than three times the horizontal scanning frequency.

The output 66 of the stereo multiplexer 64 is coupled with a modulation signal input terminal of a radio frequency (RF) transmitter circuit 70 operative to frequency modulate a 913 MHz carrier which is supplied at an output terminal thereof to the transmitting antenna 72 to be radiated within a local transmission area, typically within a radius of approximately one hundred feet from the transmitter unit 20. Transmitting antenna 72 may be, for example, a quarter wave dipole antenna complying with applicable regulatory enactments. It will be appreciated that the reception range of the transmitted signal will depend not only on the choice of the transmitting antenna 72 and the RF power output by the transmitter unit 20, but also on receiver sensitivity, the presence and nature of objects within the transmission path, as well as other factors.

Power for operating the transmitter unit 20, as well as for recharging a battery of the receiver unit 22, is provided, for example, by an AC/DC converter unit which plugs into a wall socket and provides a low voltage DC output. The DC output of the AC/DC converter is coupled with a DC input of the transmitter unit 20 to provide a direct current voltage thereto. A voltage regulator 80 serves to remove spikes in the input DC voltage in conventional fashion and supplies a regulated DC voltage at an output 82 thereof. The output 82 is coupled with an input of a power switching circuit 90 which is shown in greater detail in FIG. 3.

Figure 3:
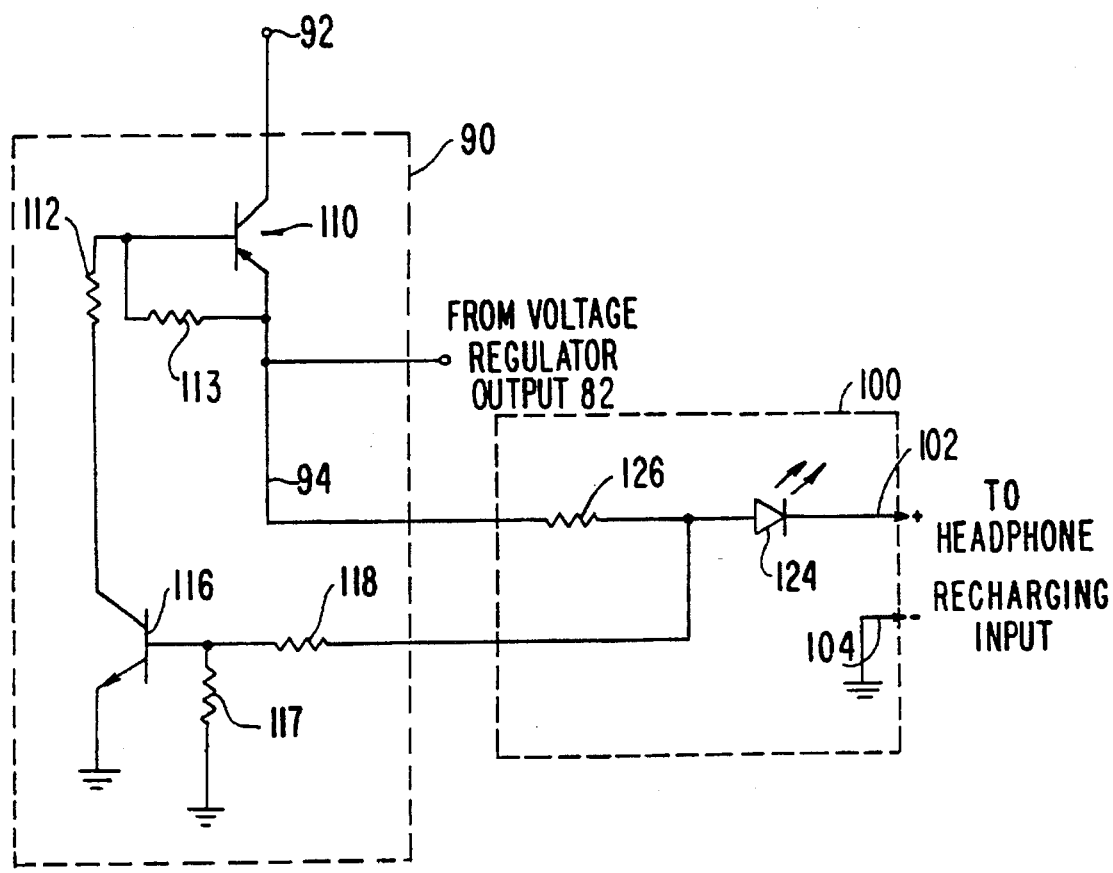
FIG. 3 is a block diagram of a power switching circuit and battery charger of the transmitter unit of FIG. 2A.

With reference also to FIG. 3, the power switching circuit 90 has a first power output 92 coupled with power input terminals of the overmodulation detector 50, the stereo multiplexer 64 and the RF transmitter circuit 70 to controllably provide operating power thereto. A second power output 94 of the power switching circuit 90 is coupled with a power input of a battery charger 100 to controllably provide power thereto. Battery charger 100 has a pair of output charging terminals including a positive charging terminal 102 and a negative charging terminal 104 coupled through the recharging cable 38 with the recharging plug 36 of FIG. 1.

Referring to FIG. 3, power switching circuit 90 includes a PNP switch transistor 110 having its emitter connected with the output 82 of the voltage regulator 80 and its collector connected with the first power output 92 of the power switching circuit 90. The base of the transistor 110 is connected with a first terminal of a fixed resistor 113 whose second terminal is connected with the emitter of transistor 110, the second power output 94 of the power switching circuit 90, and a first terminal of a current limiting resistor 126. A second terminal of resistor 126 is connected to the anode of an LED indicator 124 whose cathode is connected to positive battery terminal 102. Furthermore, a charge state detection means, comprising an NPN transistor 116 together with resistors 117 and 118, is provided to shut off the transmitter during battery charging.

When the recharging plug 36 is connected with the jack 35 of the receiver unit 22, the rechargeable battery of the receiver unit causes current to be drawn through current limiting resistor 126, developing a voltage drop across resistors 117 and 118 which act to divide the voltage thereacross and apply the divided voltage to the base of NPN transistor 116. Accordingly, the divided voltage change is sensed by NPN transistor 116, which amplifies this voltage change and applies it as an ON/OFF control signal to the base of PNP switch transistor 110 through a resistor 112. That is, when recharging current passes through resister 126, the voltage drop at the base of transistor 116 turns off its collector-emitter circuit, thus turning off transistor 110 to disable the transmitter circuits. However, when recharging plug 36 is uncoupled from jack 35 of the receiver unit 22 so that recharging current no longer flows through resistor 126, transistor 116 is turned on. Transistor 110 is also turned on as a consequence, so that power is applied to the transmitter circuits. Accordingly, so long as the receiver unit 22 is uncoupled from the transmitter unit 20, transmitter operation is enabled. However, when the recharging input of the receiver unit is coupled with the battery charger 100 so that current is drawn through resistor 126, transistor 116 is turned off, thus turning off transistor 110 and disabling the transmitter circuits.

Figure 4:
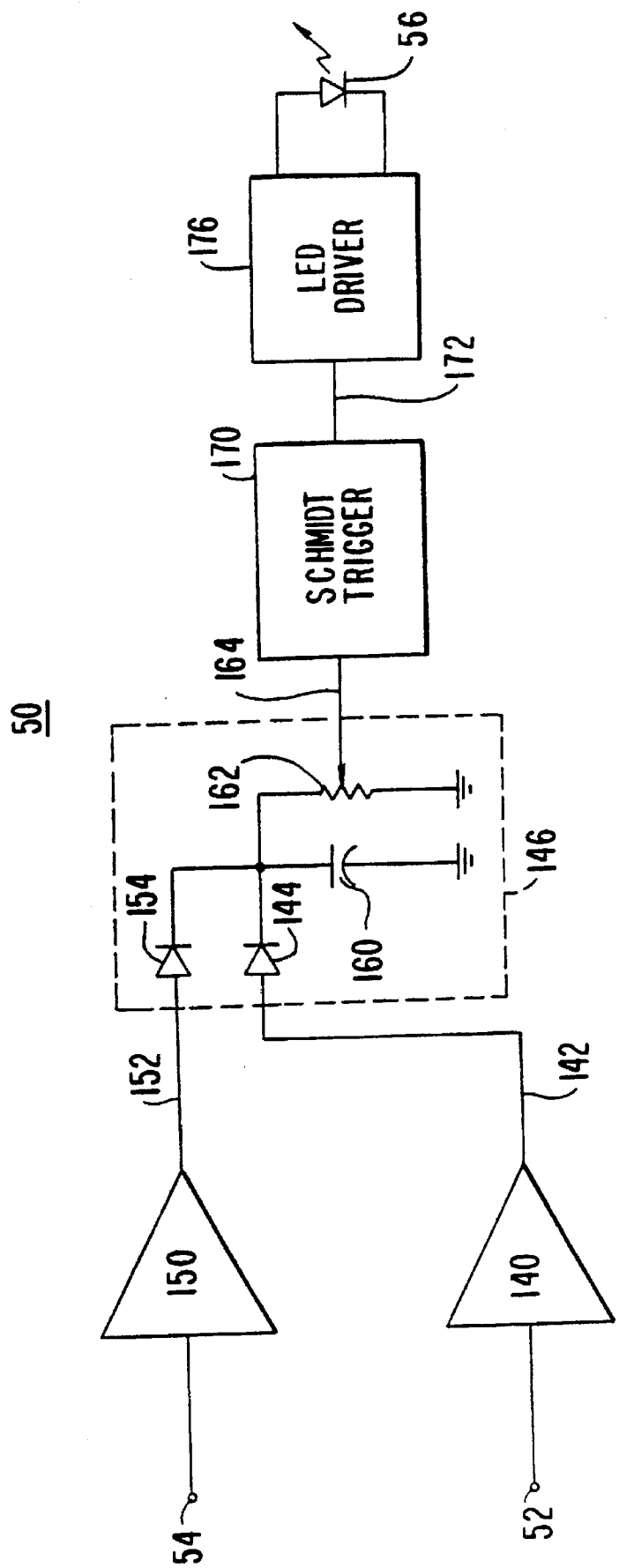
FIG. 4 is a block diagram of an overmodulation detector of the transmitter unit of FIG. 2A.

With reference now to FIG. 4, the overmodulation detector 50 is illustrated therein in greater detail. The first input terminal 52 of the overmodulation detector 50 is coupled with the input of a first buffer amplifier 140 to provide the volume adjusted first input audio signal thereto. The buffer amplifier 140 is operative to supply an output signal at an output 142 thereof which is proportional to the volume adjusted first input audio signal. The output 142 is connected with the anode of a first germanium diode 144 of a peak detector circuit 146. The second input terminal 54 of the overmodulation detector 50 is coupled with the input of a second buffer amplifier 150 to supply the volume adjusted second input audio signal thereto. Buffer amplifier 150 is operative to supply an output signal at an output terminal 152 thereof which is proportional to the volume adjusted second input audio signal. The output 152 of the, buffer amplifier 150 is connected with the anode of a second germanium diode 154 of the peak detector circuit 146.

The cathodes of the first and second germanium diodes 144 and 154 are connected with the first terminal of a fixed capacitor 160 as well as to the first fixed terminal of a potentiometer 162. A second terminal of the capacitor 160 as well as a second fixed terminal of the potentiometer 162 are connected to ground. A movable contact of the potentiometer 62 is connected with an output 164 of the peak detector circuit 146. It will be appreciated, therefore, that the buffer amplifiers 140 and 150 will serve to charge the fixed capacitor 160 through the germanium diodes 144 and 154, respectively, until the voltage across the capacitor 160 is substantially equal to the voltage of the higher of the two output signal values provided at the output terminals 142 and 152 of the buffer amplifiers 140 and 150. The germanium diodes 144 and 154 serve to prevent the reverse flow of charge from the capacitor 160 back into either of the output terminals 142 and 152 thus to produce a peak value signal in the form of the voltage across the capacitor 160 substantially equal to the higher one of the signals provided at the output terminals 142 and 152. It will be appreciated that the germanium diodes 144 and 154 each desirably produce a minimal voltage drop of approximately 0.2 volts. It will also be seen that the potentiometer 162 will bleed charge from the capacitor 160, so that once a peak value has been reached by a respective one of the output signals at one of the output terminals 142 and 152 and the value thereof decreases from such peak value, the peak voltage thereby produced across the capacitor 160 will decay in value as charge is removed therefrom through the potentiometer 162. As will be seen below, the rate at which charge is bled from the capacitor 160 is controlled in order to ensure that the value of the voltage across the capacitor 160 decreases after the occurrence of a corresponding narrow peak at a rate less than a rate of decrease of the corresponding narrow peak.

The output 164 of the peak detector circuit 146 is coupled with the trigger input of a Schmitt trigger circuit 170. Schmitt trigger circuit 170 has an output terminal 172 where it supplies an output signal which is either at a first, low voltage level or at a second, high voltage level depending both on the present voltage level of the trigger input as well as the prior history thereof, so that the response of the Schmitt trigger circuit 170 to the trigger input is subject to hysteresis. That is, if the output signal of the circuit 170 at a given point in time is at the first, low voltage level, a transition of the trigger input voltage from a relatively low voltage which is less than an ON trigger level of the circuit 170 to a value higher than such ON trigger level will result in a state change of the output voltage at terminal 172 from the first, low voltage level to the second, higher voltage level. However, a subsequent decrease of the trigger input voltage below the ON trigger level will not thereby result in a state change at the output 172 to the first, low voltage level until the trigger input voltage falls below an OFF trigger level which is less than the ON trigger level.

Accordingly, when the voltage at the output of the peak detector circuit 146 rises above the ON trigger level when at least one of the signals provided at the outputs of the buffer amplifiers 140 and 150 exceeds a predetermined overmodulation level at a time when the output of the Schmitt trigger circuit 170 is in its first, low voltage level state, the circuit 170 responds by changing the state of its output to the second, high voltage level, thus to provide an overmodulation detection signal. Since the output level of the peak detector circuit 146 may be adjusted with the use of the potentiometer 162, it is thus possible to adjust the output of the peak detector circuit so that it exceeds the ON trigger level of the circuit 170 at the point where an overmodulation condition first occurs. The output 172 of the Schmitt trigger circuit 170 is coupled with the input of an LED driver circuit 176 having an output coupled with the LED 56 and operative to energize the LED 56 to emit a visible light signal when the voltage level at the output 172 of the circuit 170 is at the second, high voltage level, thus to provide a visible indication to a user that overmodulation is occurring.

Figure 5:
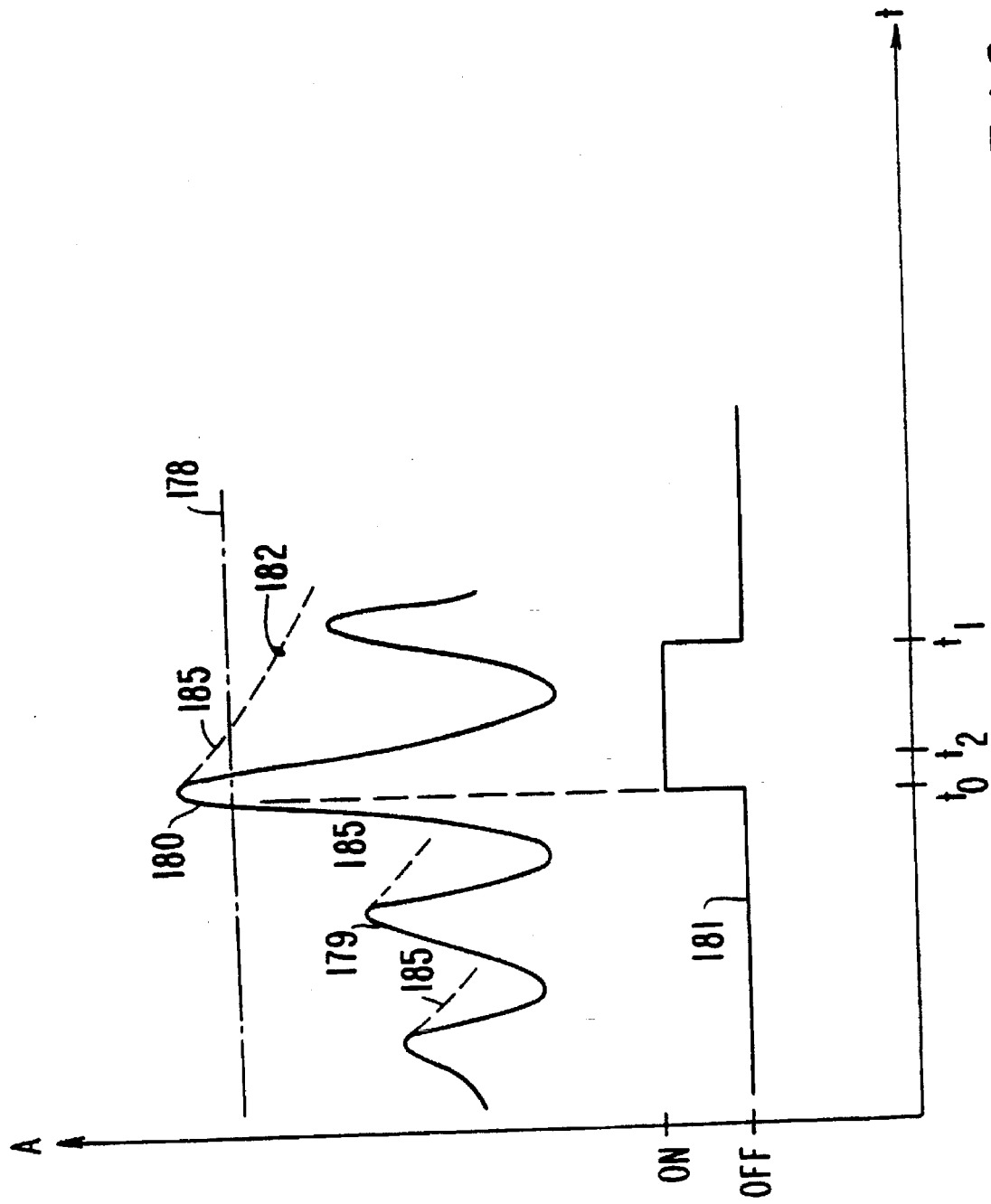
FIG. 5 is a waveform diagram for illustrating the operation of the overmodulation detector of FIG. 4.
Figure 7A:
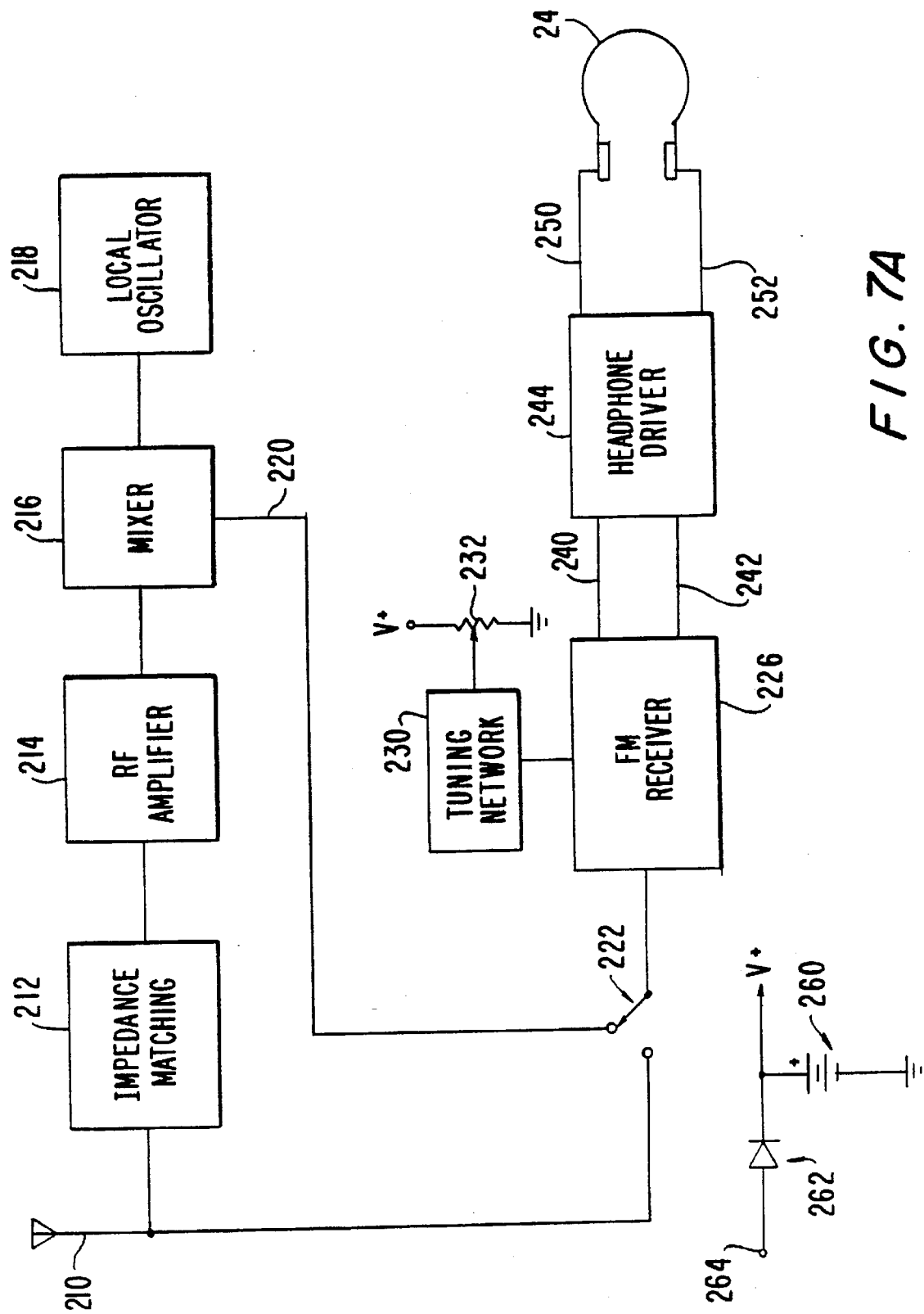
FIGS. 7A–7E are block diagrams of a receiver unit of the FIG. 1 embodiment.
Figure 7B:
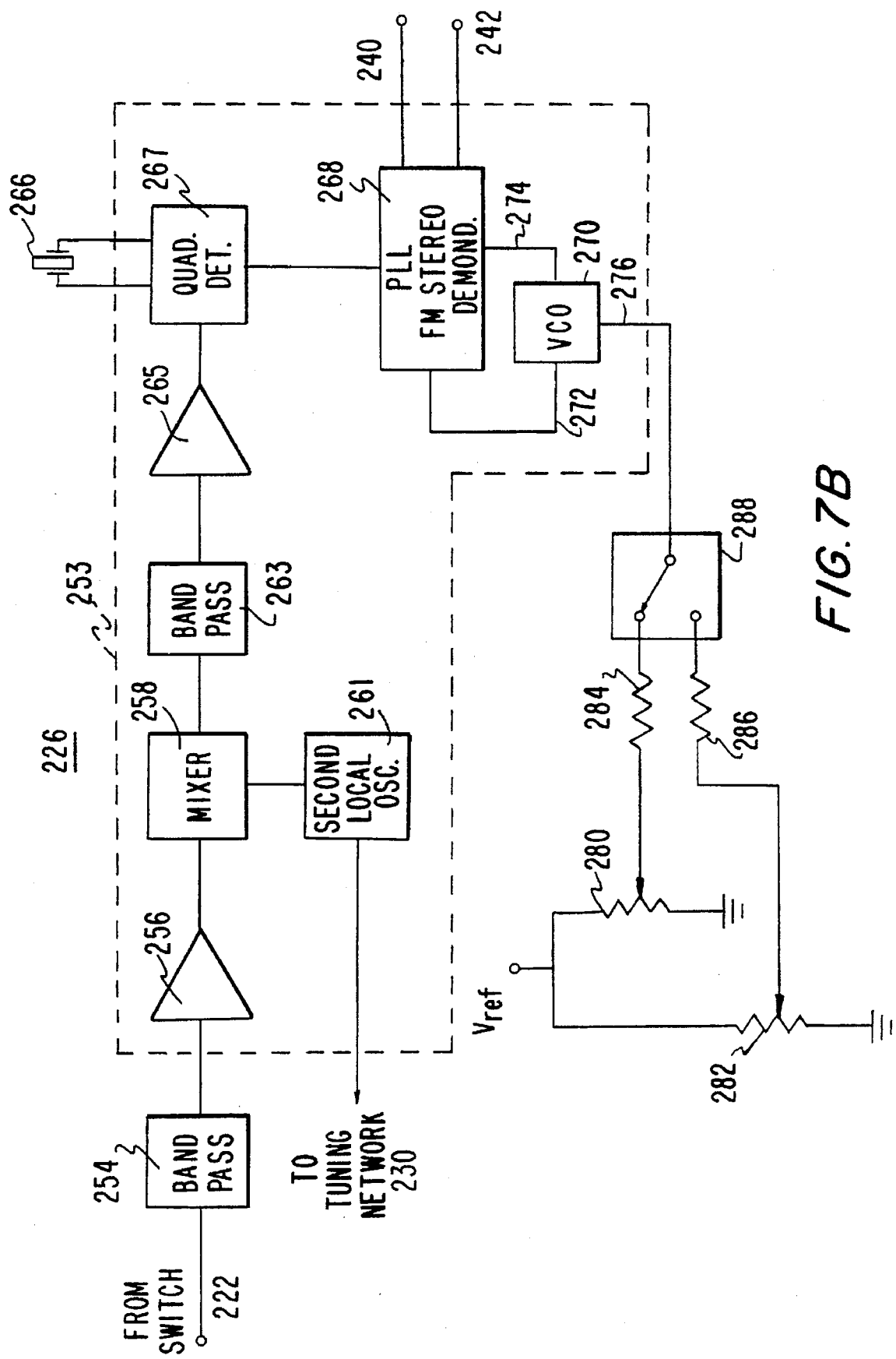
Figure 7C:
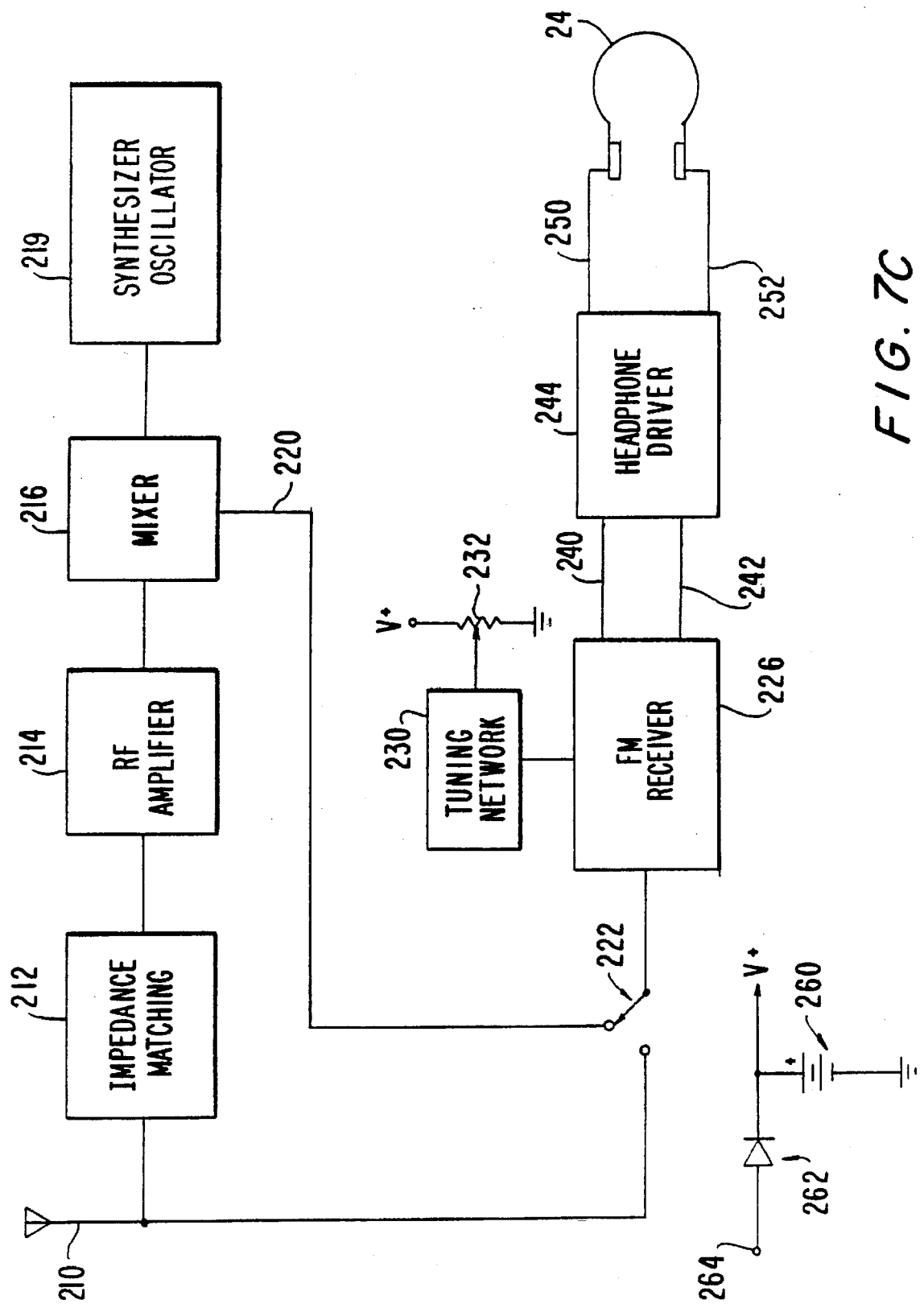
Figure 7D:
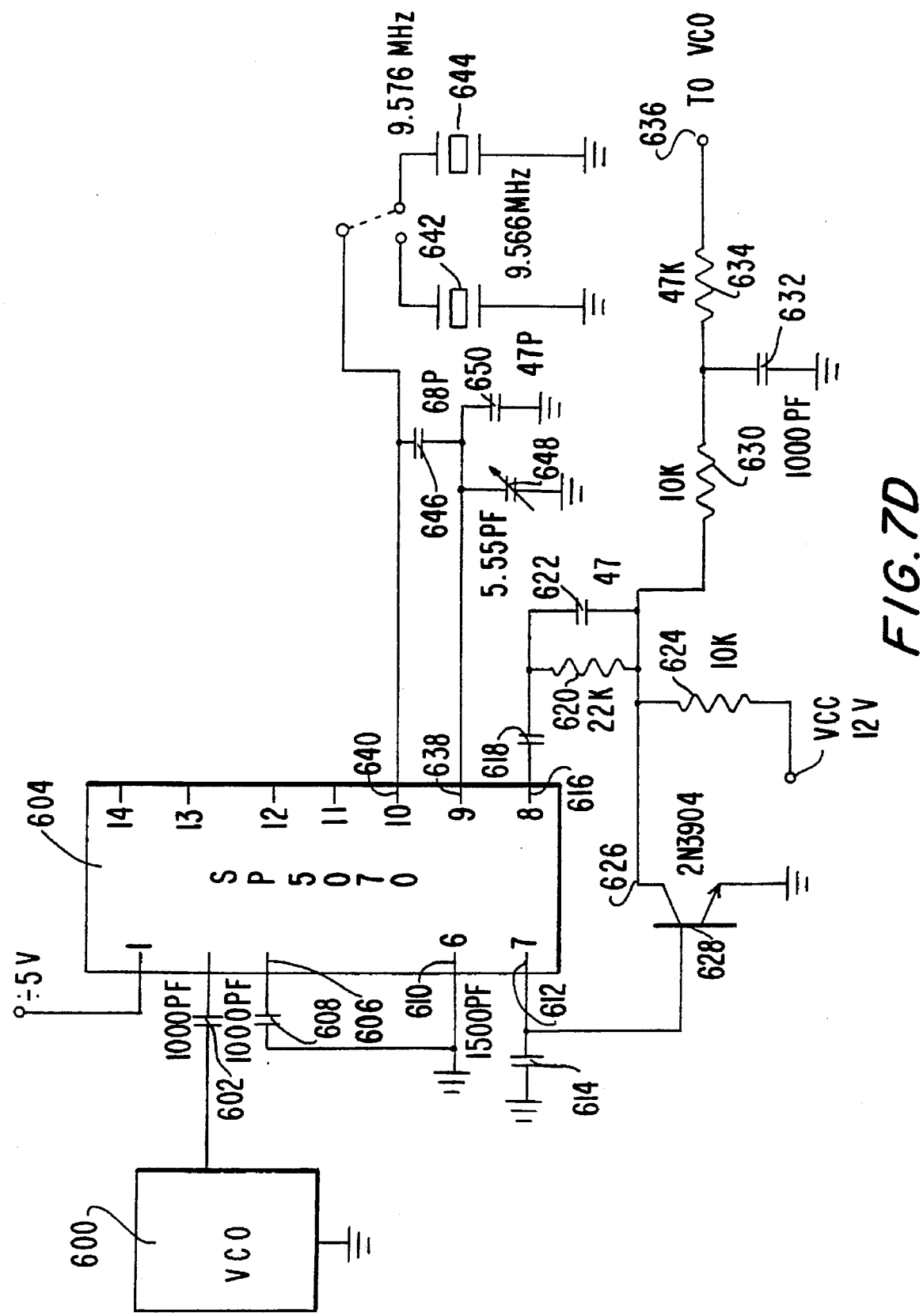
Figure 7E:
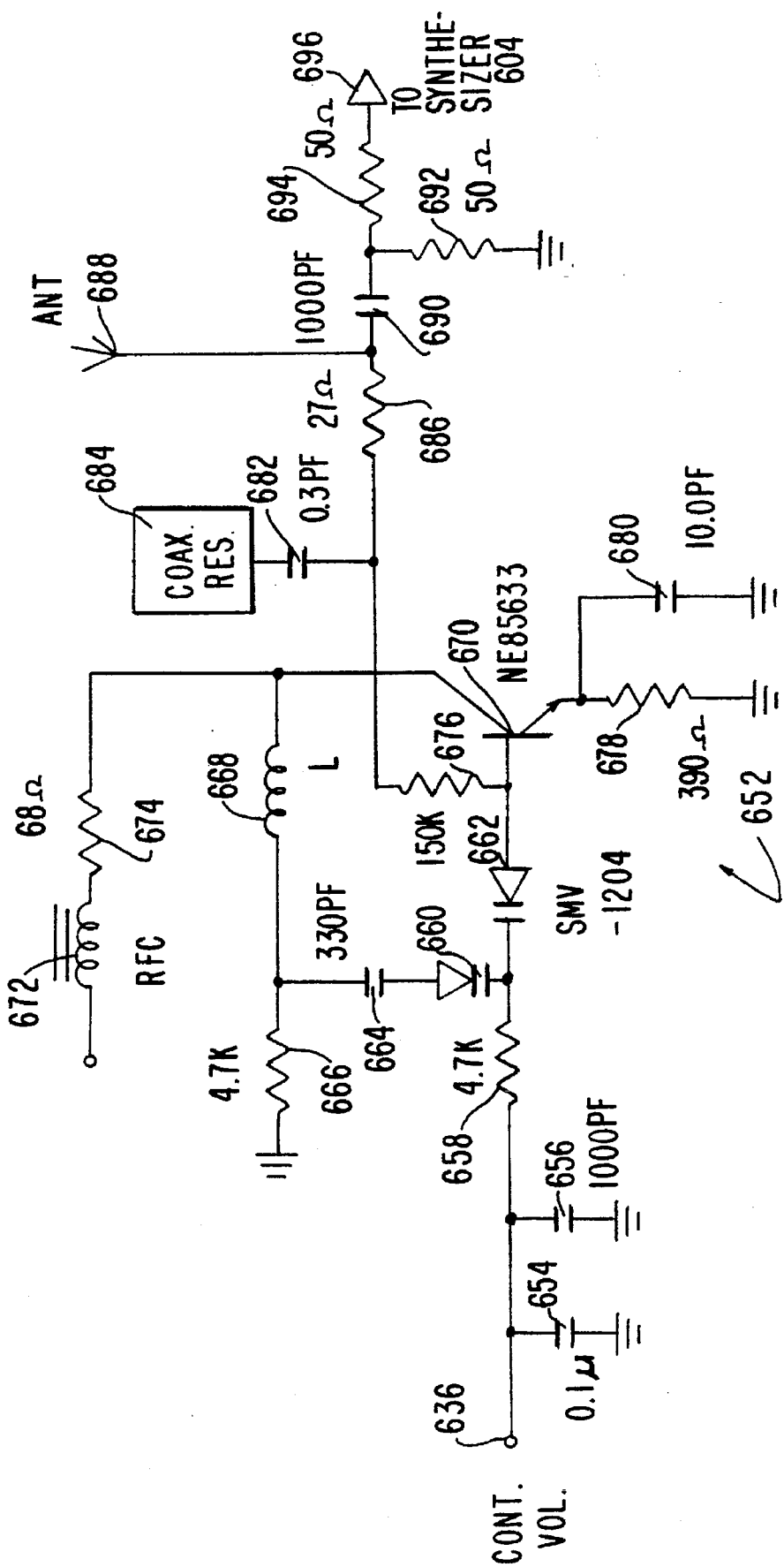

As explained hereinabove, certain peak signal values in the form of sharp voltage spikes representing, for example, large high frequency components of either the first or second input audio signals may exceed the overmodulation level for a period of time which is too brief to produce a visible output from the LED 56 if it is energized for only the brief interval during which the audio signal exceeds the overmodulation level. For such narrow audio signal peaks, therefore, the rate at which the voltage across the capacitor 160 of the peak detector circuit 146 decays as it discharges through the potentiometer 162 and the trigger input of the circuit 170, is selected so that it is slower than the rate at which the level of the input audio signal decreases from its narrow peak value. With reference also to FIG. 5, one of the audio output signals from the amplifiers 140 and 150 having a higher amplitude than the other thereof is illustrated as a solid line waveform 179 plotted along a time axis t and having an amplitude measured by an orthogonal axis A. The output of the Schmitt trigger circuit 170 along the same time axis is represented by the waveform 181 of FIG. 5. In the waveform diagram of FIG. 5, moreover, the voltage across the capacitor 160 of the peak detector circuit 146 substantially coincides with that of the audio output signal except where the audio output signal is decreasing in value, whereupon the voltage across capacitor 160 diverges from the value of the audio signal as indicated by the dash lines 185 in FIG. 5.

If it is assumed that the output of the peak detector circuit is selected by the potentiometer 162 to be the same as the voltage across the capacitor 160, and the ON trigger level of the circuit 170 is represented by the one-dot chain line 178 of FIG. 5, at a time $t_0$ at which a relatively narrow peak of the audio signal 180 first exceeds the ON trigger level 178, the output 181 of the Schmitt trigger circuit 170 switches from a low to a high voltage level. Once the value of the input audio signal has exceeded a peak amplitude level and falls in value thereafter, the output of the peak detector circuit 146 decays at a relatively slower rate so that its amplitude remains higher over time than the decreasing amplitude of the audio signal. Since the OFF trigger level of the Schmitt trigger 170 is lower than its ON trigger level, the ON output state thereof will persist until a point in time after the output of the peak detector 146 decays below the ON trigger level of the circuit 170. Accordingly, if the point at which the output from the peak detector circuit 164 falls below the OFF trigger level of the circuit 170 occurs at a time $t_1$ as illustrated in FIG. 5 corresponding with the point 182 along the waveform 185 representing the output of the peak detector circuit 146, it will be appreciated that the output 181 of the Schmitt trigger circuit 170 will remain at a high level from time $t_0$ until time $t_1$ as shown in the illustration of FIG. 5.

It will also be seen by reference to FIG. 5 that the relatively narrow peak 180 of the audio signal will fall below the ON trigger level of the Schmitt trigger 170 at a point $t_2$ corresponding with the cessation of the overmodulation condition. Accordingly, it will be seen that for narrow peaks of the input audio signals, such as the illustrative peak waveform 180 of FIG. 5, the Schmitt trigger circuit 170 will output an overmodulation detection signal persisting for a period of time substantially longer than that during which the overmodulation condition persists. The rate of decay in the voltage across the capacitor 160 as well as the difference in the ON and OFF trigger levels of the circuit 170 are selected so that the ON output state of the circuit 170 will be maintained for a predetermined minimum amount of time necessary to produce a visible output by the LED 56 even for corresponding narrow peaks of the input audio signals which exceed the overmodulation level for a shorter period of time.

It will be appreciated that, if the rate of decay of the voltage across the capacitor 160 is made sufficiently low, in certain embodiments the Schmitt trigger circuit 170 may be replaced, for example, by a threshold detector or similar device for generating the overmodulation detection signal having a duration longer than that during which predetermined narrow peaks of the input audio signal exceed the overmodulation level. In addition, it will be appreciated that in certain further embodiments, the peak detector 146 may be eliminated if the difference in the ON and OFF trigger levels of the Schmitt trigger circuit 170 are set at substantially different values, thus to lengthen the duration of the ON output state of the circuit 170 to provide a visible indication of signal peaks which exceed the overmodulation level for a relatively shorter period of time.

With reference now to FIG. 6, the radio frequency (RF) transmitter circuit 70 of FIG. 2A is illustrated therein in greater detail. The circuit 70 has an input terminal 190 coupled with the multiplexer output terminal 66 (FIG. 2A) to receive the multiplexed stereo modulation signal therefrom. The terminal 190 is connected with the cathode of a varactor diode 192 whose anode is connected to ground. The input terminal 190 is also connected with a first terminal of a fixed capacitor 194 having a second terminal connected with a first terminal of a two terminal ceramic resonator 196 whose second terminal is connected to ground.

The ceramic resonator 196, varactor diode 192 and capacitor 194 connected in the foregoing manner constitute a resonant circuit whose resonant frequency is determined principally by that of the ceramic resonator 196. The ceramic resonator 196 is loaded by the varactor diode 192 through the fixed capacitor 194, so that as the multiplexed stereo modulation signal received at the terminal 190 varies the capacitance of the varactor diode 192, the resonant frequency of the circuit consisting of the varactor diode 192, capacitor 194 and ceramic resonator 196 varies linearly therewith. The first terminal of the ceramic resonator 196 and second terminal of the capacitor 194 are coupled with an oscillator 200 through a fixed capacitor 198 which is operative to produce an oscillation voltage at the resonant frequency of the circuit consisting of the resonator 196, diode 192 and capacitor 194. The resonant frequency of the ceramic resonator is selected as 913 MHz, so that the oscillator 200 produces an oscillation voltage of approximately 913 Mhz frequency modulated by the multiplexed stereo audio signal received at the terminal 190. The ceramic resonator 196 provides high frequency stability, but possesses a relatively low Q, so that the variable loading produced by the varactor diode 192 in response to changes in the modulation signal produces relatively large variations in the frequency of the oscillation voltage, thus to advantageously achieve a high signal-to-noise ratio thereof.

The oscillator 200 has an output terminal 202 coupled with an input of an impedance matching circuit 204 which serves to match the output impedance of the oscillator 200 with the impedance of a transmitting antenna 206 coupled with an output of the impedance matching circuit 204 to receive the frequency modulated oscillation voltage therefrom, thus to radiate a frequency modulated radio signal within a local transmission area.

The circuitry of the receiver unit 22 is illustrated in greater detail in FIG. 7. The receiving antenna 210 mounted on the headband support member 26, as illustrated in FIG. 1, is coupled with the input of an impedance matching network 212 having an output coupled with the input of a radio frequency (RF) amplifier 214. The impedance matching network 212 serves to match the impedance of the receiving antenna 210 with the input impedance of the RF amplifier 214. The RF amplifier 214 serves to boost the level of the received 913 Mhz signal from the transmitter unit 20 and provides the amplified signal to a first input of an active mixer 216. The RF amplifier 214 is advantageously implemented by a dual-gate MOSFET which provides high gain amplification with low noise. In addition, the second gate serves as a means for adjusting the gain of the MOSFET to achieve automatic gain control (AGC) in response to an AGC voltage supplied in conventional fashion by AGC circuits (not shown for purposes of simplicity and clarity).

The receiver unit 22 includes a local oscillator 218 coupled with a second input of the mixer 216 to supply a local oscillation voltage thereto for downconverting the received 913 MHz signal provided by the RF amplifier 214. The local oscillation voltage produced by the local oscillator 218 has a fixed frequency of approximately 978 MHz stabilized by a SAW resonator. Accordingly, the mixer 216 serves to down convert the 913 MHz signal received from the RF amplifier 214 with the use of the 978 MHz local oscillation voltage. More specifically, it will be appreciated that the mixer 216 down converts a band of frequencies from the 900 MHz local transmission band including the band of frequencies in which the frequency modulated radio signals from the transmitter unit 20 are contained.

The downconverted signals are supplied at an output 220 of the mixer 216 which is coupled with a first fixed terminal of a single pole double throw switch 222. A second fixed terminal of the switch 222 is connected with the receiving antenna 210. A movable terminal of the switch 222 is coupled with the radio frequency input of an FM receiver 226 so that either the down converted signals output by the mixer 216 or signals picked up by the receiving antenna 210 may be supplied to the FM receiver 226. The FM receiver 226 in accordance with a preferred embodiment of the present invention comprises an FM broadcast band receiver integrated circuit capable of tuning either the band of downconverted signals provided by the mixer 216 at a frequency of approximately 65 MHz or else the FM broadcast band signals provided thereto directly from the receiving antenna 210, and is capable of demultiplexing the stereo audio signals included either in the downconverted signals or the FM broadcast signals. A suitable FM receiver integrated circuit is the Sony Model CXA 1238M/S integrated circuit. A switchable tuning network 230 is coupled with the FM receiver 226 and is operative to selectively tune the FM receiver 226 either at approximately 65 MHz or within the FM broadcast band (in the United States, extending from approximately 88 MHz to 108 MHz). The tuning network 230 is coupled with the movable contact of a potentiometer 232 having a first fixed terminal connected to receive a positive supply voltage V⁺ and a second fixed terminal connected to ground. The movable terminal of the potentiometer 232 is coupled with a varactor diode of the tuning network 230 (not shown for purposes of simplicity and clarity) to adjustably tune a selected one of the downconverted 65 MHz signal provided from the mixer 216 or a desired station within the FM broadcast band.

The FM receiver 226 provides the demultiplexed left and right channel audio signals produced from the received radio frequency signals at respective outputs 240 and 242 coupled with respective inputs of a headphone driver 244. The headphone driver 244 amplifies the left and right channel audio signals from the FM receiver 226 which it supplies at respective outputs 250 and 252 for provision to respective electroacoustic transducer elements of the stereo headphone unit 24. The headphone driver 244 also includes a volume control (not shown for purposes of simplicity and clarity) for controlling the loudness of the acoustic signals produced by the transducers of the headphone unit 24.

The supply voltage V⁺ is provided to the circuits of the receiver unit 22 from a rechargeable battery 260 mounted within the housing 34 of FIG. 1. A positive charging input terminal 264 of the receiver unit 22 connected with the recharging input jack 35 thereof, is coupled with the anode of a diode 262 whose cathode is coupled with the positive terminal of the rechargeable battery 260, thus to prevent discharge of the battery 260 through the positive charging input terminal 264.

Figure 8:
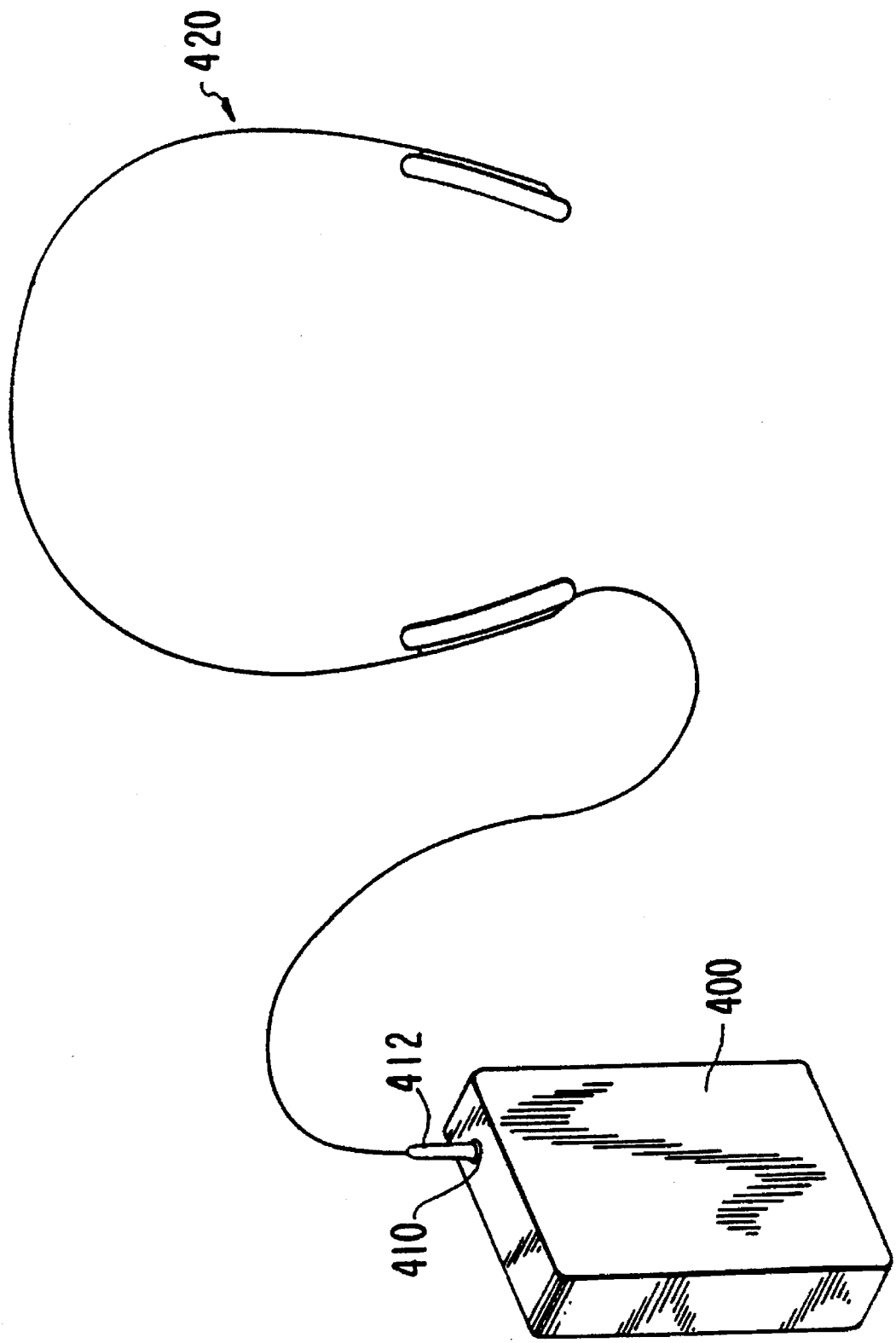
FIG. 8 is a diagrammatic view of a further embodiment of a receiver unit in accordance with the present invention.

With reference now to FIG. 8, an alternative embodiment of a receiver unit in accordance with the present invention is illustrated therein in which the circuity of the receiver unit is enclosed within and supported by an enclosure unit 400. Accordingly, the unit 400 encloses and supports each of the elements 212 through 244 as well as the diode 262 and rechargeable battery 260. The outputs 250 and 252 of the headphone driver 244 are connected with a stereo output jack 410 mounted on the enclosure unit 400 for coupling the stereo input plug 412 of a stereo headphone unit 420 with the headphone driver 244 to supply the stereo audio signals output by the receiver unit to the headphone unit 420. The enclosure unit 400 is shaped generally as a rectangular parallelepiped and dimensioned to fit within the shirt pocket of a user, so that the receiver unit may be carried conveniently on the person of the user. In addition, by mounting the receiver unit's circuitry as well as its rechargeable battery within the enclosure unit 400 and apart from the headphone unit 420, the user may select whatever headphone unit he or she may wish to use with the receiver unit.

It will be appreciated that the elements of the receiver unit are readily implemented with a relatively small number of components and that, due to the compact size of the FM receiver integrated circuit, all of the circuitry of the receiver unit 22 may be constructed, as indicated in FIG. 1, as a light weight and miniaturized apparatus which is affixed to the headband support member 26, or, as illustrated by FIG. 8, supported within an enclosure which fits in the user's pocket. Accordingly, the receiver unit may be worn by or carried on the user in order to receive either the locally transmitted audio signals from a selected local audio source, or else a desired FM broadcast signal. Since the locally transmitted signals are not line-of-site transmissions, it is possible for the user to move about within the local transmission area while receiving the signals from the transmitter unit 20 despite the intervention of walls and other objects.

Although specific embodiments of the invention have been described in detail herein with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A local area wireless stand alone audio signal transmission and receiver system, comprising:
a transmitter transmitting stereo multiplexed FM audio signals within a first, relatively high frequency band at least as high as approximately 900 MHZ; and
a receiver located within said local area, said receiver comprising:
an antenna to receive the transmitted FM audio signals;
a first downconverter connected to said antenna to reduce the frequency of the transmitted stereo multiplexed FM audio signals to a second frequency band lower than the first, relatively high approximately 900 MHZ frequency band,
a standard FM audio receiver wired to said first downconverter to detect and restore said audio signals from said transmitted FM audio signals within said second frequency band; said standard FM audio receiver comprising a second downconverter to downconvert from said second frequency band to a lower frequency used to generate audio signals,
at least one of said first or second downconverters being tunable,
wherein the frequency of said FM audio signal in said second frequency is capable of being received by said standard FM radio receiver;
a tuning network connected to said standard FM radio receiver to detect said FM audio signal in said second frequency band, at least one electroacoustical transducer to which said audio signals detected and restored by said FM audio receiver is supplied;

wherein said receiver is capable of being easily moved by an individual within said local area while still receiving said transmitted FM audio signals; and wherein said second frequency band is outside the commercial FM band of 88 to 108 MHZ.

2. The invention of claim 1 wherein the standard FM radio receiver is operable to process FM audio signals in the range of approximately 30 to 120 MHz.

3. The invention of claim 1 wherein said receiver is housed in headphones.

4. The invention of claim 3 wherein said standard FM receiver is an integrated circuit.

5. The invention of claim 1 wherein said standard FM radio receiver is an integrated circuit.

6. The invention of claim 1 wherein said standard FM radio receiver is also operable to separate multiplexed stereo signals from said audio signals after detection and restoration from said FM audio signals within said second frequency band.

7. The invention of claim 1 wherein said standard receiver is portable.

8. The invention of claim 1 wherein said second frequency band is outside the normal range at which the standard FM radio receiver receives FM signals.

9. The invention of claim 8 wherein said first or second downconverters are manually tunable.

10. The invention of claim 8 wherein said standard FM audio receiver is also operable to separate multiplexed stereo signals from said audio signals after detection and restoration from said FM audio signals within said second frequency band.

11. The invention of claim 8 wherein said receiver is portable.

12. The invention of claim 1 wherein said audio signals are high fidelity.

13. The invention of claim 1 wherein said first or second downconverters are manually tunable.

14. A local area wireless stand alone receiver for audio signals transmitted as stereo multiplexed FM audio signals within a first, relatively high frequency band at least as high as approximately 900 MHZ; said receiver being movable from place to place by the user within the local area, and further comprising:

an antenna to receive the transmitted FM audio signals;

a first downconverter connected to said antenna to reduce the frequency of the transmitted stereo multiplexed FM audio signals to a second frequency band lower than the first, relatively high approximately 900 MHZ frequency band, a standard FM radio receiver wired to said downconverter to detect and restore said audio signals from said transmitted FM audio signals within said second frequency band; said standard FM radio receiver comprising a second downconverter responsive to downconvert from said second frequency band to a lower frequency used to recover said audio signals, at least one of said first or second downconverters being tunable, wherein the frequency of said FM audio signal in said second frequency band is capable of being received by said standard FM radio receiver;

a tuning network connected to the standard FM radio receiver to detect said FM audio signal in said second frequency band, at least one electroacoustical transducer to which said audio signal detected and restored by said FM radio receiver is supplied, and wherein said second frequency band is outside the commercial FM band of 88 to 108 MHZ.

15. The invention of claim 14 wherein the standard FM audio receiver is operable to process FM audio signals in the range of approximately 30 to 120 MHz.

16. The invention of claim 14 wherein said receiver is housed in headphones.

17. The invention of claim 16 wherein said standard FM receiver is an integrated circuit.

18. The invention of claim 14 wherein said standard FM audio receiver is an integrated circuit.

19. The invention of claim 14 wherein said second frequency band is outside the normal range at which the standard FM radio receiver receives FM signals.

20. The invention of claim 14 wherein said first or second downconverters are manually tunable.

21. The invention of claim 14 wherein said audio signals are high fidelity.

* * * * *

UNITED STATES PATENT AND TRADEMARK OFFICE
CERTIFICATE OF CORRECTION

PATENT NO. : 5,666,658
DATED : September 9, 1997
INVENTOR(S) : Robert L. Borchardt, et al It is certified that error appears in the above-indentified patent and that said Letters Patent is hereby corrected as shown below:

On the title page item [54],

Change the title to read: --FM WIRELESS TRANSMISSION SYSTEM WITH TWO STAGE DOWNCONVERSION FOR PORTABLE WIRELESS SPEAKERS--

Signed and Sealed this

Twenty-first Day of July, 1998

Attest:

BRUCE LEHMAN

Attesting Officer

Commissioner of Patents and Trademarks